United States Patent
Hashimoto et al.

(10) Patent No.: US 7,152,434 B2
(45) Date of Patent: Dec. 26, 2006

(54) METHOD FOR PRODUCING PLANAR LENS AND PLANAR LENS ARRAY

(75) Inventors: Takahiro Hashimoto, Osaka (JP); Kenjiro Hamanaka, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 542 days.

(21) Appl. No.: 10/418,224

(22) Filed: Apr. 18, 2003

(65) Prior Publication Data

US 2003/0209040 A1 Nov. 13, 2003

(30) Foreign Application Priority Data

Apr. 18, 2002 (JP) .............................. P2002-115628

(51) Int. Cl.
*G02B 3/00* (2006.01)
(52) U.S. Cl. .............. 65/392; 219/121.6; 219/121.73; 219/121.74; 219/121.75; 219/121.85
(58) Field of Classification Search .................. 65/64, 65/106, 111, 386, 387, 392; 219/121.6, 121.73, 219/121.74, 121.75, 121.85
See application file for complete search history.

(56) References Cited

U.S. PATENT DOCUMENTS

| | | | |
|---|---|---|---|
| 3,588,440 A * | 6/1971 | Morse | 219/121.65 |
| 4,478,768 A * | 10/1984 | Takeoka et al. | 264/1.37 |
| 5,604,635 A * | 2/1997 | Lawandy | 359/620 |
| 5,665,136 A * | 9/1997 | Komachi | 65/102 |
| 5,951,731 A * | 9/1999 | Tsunetomo et al. | 65/61 |
| 6,262,389 B1 * | 7/2001 | Koyama et al. | 219/121.71 |
| 6,470,712 B1 * | 10/2002 | Koyama et al. | 65/392 |
| 6,593,067 B1 * | 7/2003 | Lee et al. | 430/321 |
| 6,706,154 B1 * | 3/2004 | Yang et al. | 204/157.15 |

* cited by examiner

*Primary Examiner*—Sean Vincent
(74) *Attorney, Agent, or Firm*—Whitham, Curtis, Christofferson & Cook, PC

(57) ABSTRACT

A glass substrate is irradiated with a converged laser beam to thereby form a spherical or nearly spherical convex portion on a surface of the glass substrate. More preferably, there may be used a method including the steps of: sticking a glass substrate to a flat member having a predetermined spherical or aspherical concave portion formed therein; and irradiating a converged laser beam onto a surface of the glass substrate just under the concave portion while making the converged laser beam penetrate through the flat member to thereby form a spherical or aspherical convex portion in the inside of the concave portion in accordance with the shape of the concave portion.

6 Claims, 3 Drawing Sheets

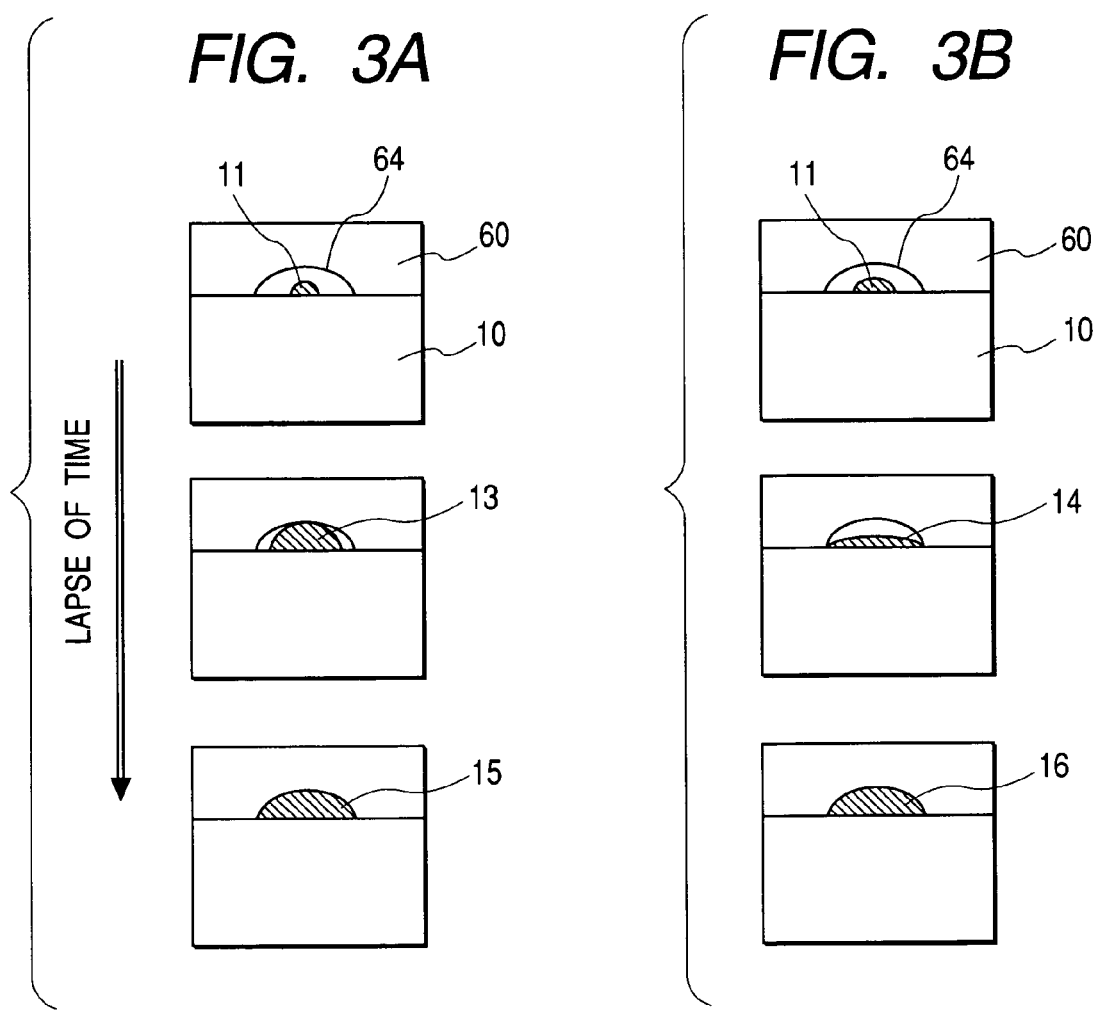

METHOD FOR PRODUCING PLANAR LENS AND PLANAR LENS ARRAY

The present application is based on Japanese Patent Application No. 2002-115628, the entire contents of which are incorporated herein by reference.

BACKGROUND OF THE INVENTION

1. Field of the Invention

The present invention relates to a method for producing a very small lens and particularly to a method for producing a planar lens or planar lens array of glass.

2. Related Art

A very small lens formed on a flat transparent substrate so that the lens has a diameter of not larger than the order of hundreds of microns, that is, a so-called microlens or an array of such very small lenses arranged one-dimensionally or two-dimensionally (i.e., microlens array) is widely known in the field of optical communication and optoelectronics such as coupling of an optical fiber to another optical element or convergence of light for illuminating a liquid crystal display element.

A microlens called "dioptric lens" in this type microlenses is produced in such a manner that a convex or concave portion is formed on or in a surface of a transparent substrate to exhibit a lens function. As a method for producing such a dioptric microlens or dioptric microlens array, the following methods are known.

That is, there have been proposed a stamping method in which a resin is transfer-molded onto a glass substrate by a molding tool having a very small concave portion, a method in which a resin layer having a convex portion formed by such stamping is removed by dry etching to form a convex portion on a surface of a glass substrate, a molding method in which glass is press-molded at a high temperature by use of a mold having a very small concave portion, and a method in which after a photosensitive material on an optical substrate is exposed to light by use of a concentration distribution mask, the optical substrate is etched to engrave a lens shape. The proposed methods are practically used for forming lenses.

The resin lens, however, has a problem that the resin lens cannot sufficiently meet reliability required in the field of optical communication or the like because the resin lens is inferior in durability to the glass lens. From this point of view, a microlens made of only glass is preferred because it has sufficient durability. A long time is however required for forming the lens by processing due to dry etching because the etching rate is low. Particularly when a multicomponent glass material is used, there is a problem that roughness easily occurs in an etched surface because of difference in etching rate between components.

SUMMARY OF THE INVENTION

The invention is developed to solve the problem and an object of the invention is to provide a method for producing a microlens or microlens array of only glass which can be formed in a short time.

A method of producing a planar lens according to the invention includes converging and irradiating a laser beam onto a glass substrate to thereby form a spherical or nearly spherical convex portion on a surface of the glass substrate.

The surface of the glass substrate is locally heated by the laser beam used as a heat source to thereby form a convex portion (swelling). The external shape of the convex portion is nearly spherical, so that this can be used as a dioptric microlens. "Spherical convex portion" described in the present application corresponds to such the convex portion. Incidentally, it is not necessary that the external shape is hemispherical.

Preferably, there may be used a method including the steps of: sticking a glass substrate to a flat member having a predetermined spherical or aspherical concave portion formed therein; and irradiating a converged laser beam onto a surface of the glass substrate just under the concave portion while making the converged laser beam penetrate through the flat member to thereby form a spherical or aspherical convex portion in the inside of the concave portion in accordance with the shape of the concave portion.

Because a local swelling based on heating due to the laser beam is molded in accordance with the concave portion formed in the flat member, a required lens shape can be obtained more accurately.

The glass substrate used may be selected so that the linear expansion coefficient of the glass substrate in a region of temperature higher than the glass transition temperature of the glass substrate is not smaller than 1.1 times, preferably not smaller than 1.35 times, more preferably not smaller than 1.47 times as large as that in a region of temperature lower than the glass transition temperature.

Because the swelling of the glass substrate in the invention is generated on the basis of a difference between the linear expansion coefficient at a higher temperature than the glass transition temperature and the linear expansion coefficient at a lower temperature than the glass transition temperature, a required convex shape can be obtained if a glass material having the ratio is selected. Incidentally, in a general material, the ratio is about 2 or lower.

The absorption factor (=100—transmittance (%)–reflectance (%)) of the glass substrate with respect to the wavelength of the laser beam used is selected to be from 30% to 95%, both inclusively, preferably from 35% to 90%, both inclusively, more preferably from 40% to 77%, both inclusively.

Because the laser beam is used as a heat source for local heating, a predetermined or larger amount of the laser beam needs to be absorbed to the glass substrate. The aforementioned absorption factor range is sufficient to achieve the object of the invention.

The transmittance of the flat member with respect to the wavelength of the laser beam used is selected to be not lower than 70%.

When a molding member is used, it is necessary to irradiate the laser beam through this member. To use energy of the laser beam efficiently, absorption to the member must be low. The aforementioned transmittance range is sufficient to achieve the object of the invention. The upper limit of the transmittance may be nearly 100%.

As a method for producing a planar lens array, there is used a method in which a plurality of predetermined positions of a glass substrate are irradiated with a laser beam. More preferably, there may be used a method in which a flat member having a plurality of predetermined spherical or aspherical concave portions arranged in predetermined positions is used and each of the concave portions is irradiated with a laser beam.

BRIEF DESCRIPTION OF THE DRAWINGS

FIGS. 3A and 3B are typical views showing states of change of a glass substrate surface in the case where a molding tool is used.

DETAILED DESCRIPTION OF THE PREFERRED EMBODIMENTS

The present inventors have found that there is a phenomenon that an irradiated portion of a surface of specific glass is swollen spherically when the surface of specific glass is irradiated with a laser beam having a wavelength exhibiting a high absorption factor. The inventors have made various experiments to use this phenomenon for forming a microlens. As a result, the invention is accomplished. A method for producing a lens will be described below in connection with specific embodiments.

(Embodiment 1)

Figure 1A:
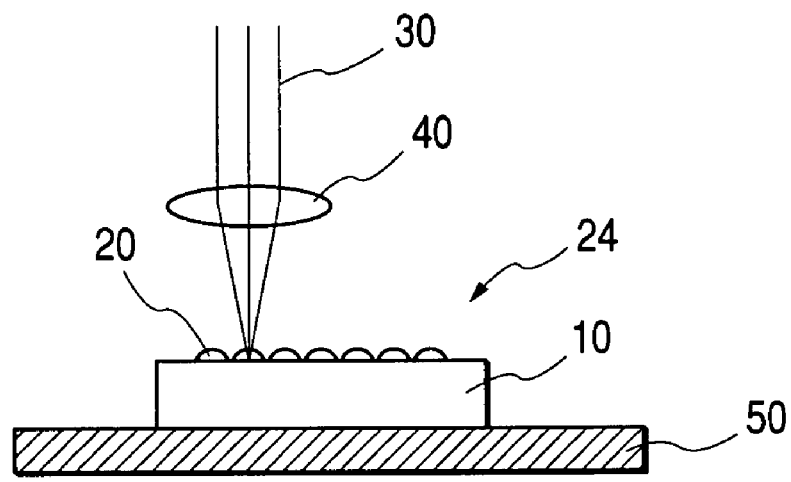
FIGS. 1A and 1B are views showing a method for producing a planar lens or lens array according to the invention.

As shown in FIG. 1A, an YAG laser beam 30 (wavelength: 1.06 μm) is converged by a lens 40 having a numerical aperture (NA) of 0.3 so that a surface of a glass substrate 10 composed of components shown in Table 1 is irradiated with the converged laser beam at an irradiation output of 3.2 W for 3 seconds. As a result, the glass surface can be locally swollen to form a microlens shape 20 with a lens diameter of about 90 μm, a focal length of about 60 μm and a wave front aberration RMS value of about 0.10λ (in which λ is the wavelength used).

When the laser output is selected to be in a range of from 1.8 W to 5.6 W and the laser beam irradiation time is selected to be in a range of from 0.1 sec. to 240 sec. in this case, a microlens having a lens diameter of from 10 μm to 500 μm and a lens height up to 70 μm can be produced.

Further, when irradiation is made by a plurality of times while the position irradiated with the laser beam 30 is moved, the formation of such a microlens can be repeated on one substrate. In this manner, a microlens array 24 can be produced in a short time. The movement of the irradiated position is preferably performed in such a manner that the glass substrate 10 is moved to predetermined positions successively by use of an X-Y drive stage 50 or the like. A method in which the position irradiated with the laser beam is scanned by an optical unit while the glass substrate is fixed may be also used.

Glass used in this embodiment and composed of components shown in Table 1 has such property that the linear expansion coefficient of the glass at a higher temperature than the glass transition temperature is 1.48 times as large as the linear expansion coefficient of the glass at a lower temperature than the glass transition temperature. The temperature of a portion of the glass irradiated with the laser beam is raised by local heating due to the laser beam so as to be higher than the glass transition temperature whereas the temperature of the periphery of the portion is kept not higher than the glass transition temperature.

In this case, as represented by the ratio, the linear expansion coefficient becomes large at a higher temperature than the glass transition temperature but the linear expansion efficient of the periphery still takes a value at a temperature not higher than the glass transition temperature. As result, the heated portion is swollen outward from the glass surface, so that a convex portion is formed on the surface of the glass substrate. Because glass is an isotropic material, a swelling is generated isotropically. Thus, a nearly spherical swelling is obtained.

Because the convex portion is formed by the mechanism, the glass surface of another glass than the glass used in this embodiment can be also locally swollen by laser beam irradiation if the linear expansion coefficient of the glass at a higher temperature than the glass transition temperature is not smaller than 1.1 times, preferably not smaller than 1.35 times, most preferably not smaller than 1.47 times as large as the linear expansion coefficient of the glass at a lower temperature than the glass transition temperature. When a general material is used, the ratio is about 2 at maximum.

Although this embodiment has shown the case where the glass substrate at ordinary temperature is irradiated with the laser beam, glass may be preheated in a range of temperature not higher than the glass transition temperature.

Although this embodiment has shown the case where an YAG laser beam (wavelength: 1.06 μm) is used as the laser beam, a laser beam may be used so that the upper and lower limits of the allowable range of the absorption factor of the used glass substrate with respect to the wavelength of the laser beam are 95% and 30% respectively, preferably 90% and 35% respectively, most preferably 77% and 40% respectively.

TABLE 1

| Component | % by weight |
|---|---|
| Na₂O | 12.9 |
| MgO | 4.9 |
| Al₂O₃ | 3.6 |
| SiO₂ | 66.1 |
| K₂O | 2.4 |
| CaO | 10.1 |

(Embodiment 2)

Figure 1B:
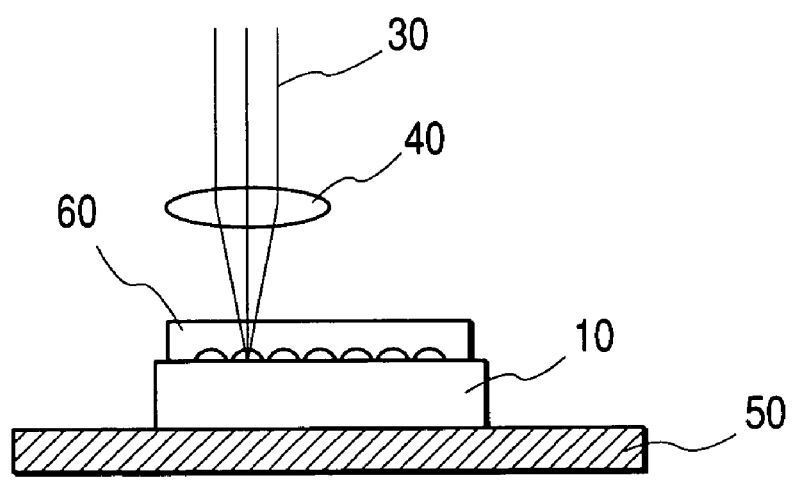
Figure 2A:
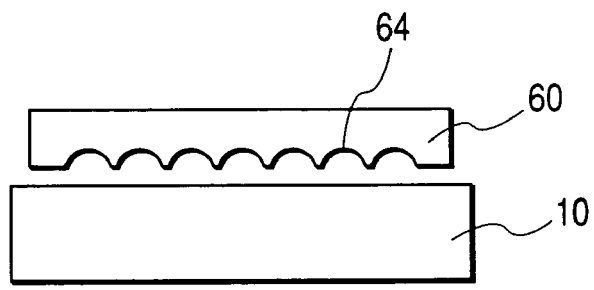
FIGS. 2A to 2C are typical views showing a molding tool and a planar lens array produced by use of the molding tool according to the invention.
Figure 2B:
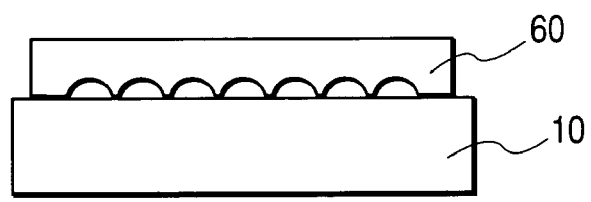

An array molding tool 60 made of quartz glass and having spherical concave portions 64 each having a diameter of 250 μm and a depth of about 20 μm as shown in FIG. 2A is stuck to a surface of a glass substrate 10 composed of components shown in Table 1 (FIG. 2B). As shown in FIG. 1B, an YAG laser beam 30 is converged in the same manner as in Embodiment 1 so that a portion of the surface of the glass substrate 10 just under one of the concave portions 64 of the molding tool 60 is irradiated with the converged laser beam 30 through the molding tool 60.

The irradiation output and the irradiation time are selected to be 3.7 W and 120 seconds respectively. As a result, the portion of the surface of the glass substrate 10 corresponding to the concave portion 64 of the molding tool 60 is locally swollen, so that the swollen portion is molded into a microlens shape 22 in accordance with the shape of the concave portion of the molding tool 60. In this manner, a microlens having a focal length of 880 μm and a wave front aberration RMS value of 0.08λ can be molded on the glass substrate.

Figure 2C:
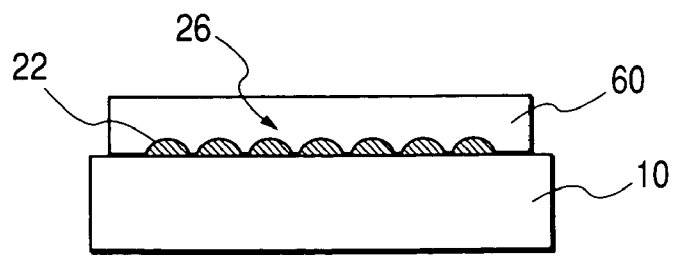

When a plurality of concave portions 64 are formed in the molding tool 60 in advance and positions corresponding to the concave portions are irradiated with the laser beam successively by a plurality of times in the same condition as described above, a microlens array 26 of only glass can be formed (FIG. 2C).

When the change of the surface of the glass substrate in the irradiated position is observed just after the laser beam irradiation, a state of the change as shown in FIG. 3A or 3B can be observed. In each of the cases shown in FIGS. 3A and 3B, a small convex portion (swelling) 11 or 12 is generated in the position irradiated with the laser beam, in the early stage of laser beam irradiation. With the lapse of time, the swelling may advance fast in a direction perpendicular to the substrate surface as shown in FIG. 3A or may advance fast in a direction of the substrate surface as shown in FIG. 3B. In the case shown in FIG. 3A, the height of a convex portion 13 is limited by the molding tool. In the case shown in FIG. 3B, the width of a portion in which a convex portion 14 will be generated is limited by the molding tool. In each case, the swelling advances with the lapse of the irradiation time until the shape of a convex portion 15 or 16 is entirely limited by the shape of the convex portion 64 of the molding tool 60.

If the concave portion 64 is sealed hermetically in this case because the glass substrate 10 is stuck to the molding tool 60, there is fear that atmospheric pressure in the inside of the concave portion 64 may increase to prevent molding when a swelling is generated on the surface of the glass substrate 10. Therefore, in order to form a shape along the concave portion 64 of the molding tool 60, it is preferable that laser beam irradiation is performed after the molding tool 60 and the glass substrate 10 are stuck to each other under reduced pressure.

Like the above description, another laser than the YAG laser may be used for irradiating a laser beam. A laser such as a $CO_2$ laser having a wavelength band absorbed to quartz glass is however unsuitable for the case where a microlens molding tool made of quartz glass is used. The wavelength of the laser beam which can be used is selected so that transmittance of the material forming the molding tool is not lower than 70%, preferably not lower than 85%, most preferably not lower than 90%. Even when a general material is used, there is some case where transmittance of nearly 100% may be obtained.

When a plurality of convex portions are formed on a glass substrate to produce a lens array, sizes of the convex portions can be changed individually and variously if the irradiation time of the laser beam is changed individually in accordance with the irradiated positions or if the concave portions of the molding tool are shaped individually. Accordingly, lens elements different in characteristic can be integrated and formed on a substrate.

A microlens made of only glass can be produced in a short time by locally heating a glass substrate by use of a laser beam. Furthermore, when a molding tool is used in combination with this method, a better lens shape can be obtained. In addition, when the laser beam irradiation is repeated by a plurality of times, a microlens array can be formed.

What is claimed is:

1. A method of producing a planar lens, comprising the steps of:

attaching a glass substrate to a flat member having a predetermined spherical or aspherical concave portion formed thereon; and irradiating a converged laser beam onto a surface of said glass substrate just under said concave portion while making said converged laser beam penetrate through said flat member to thereby form a spherical or aspherical convex portion in the inside of said concave portion in accordance with a shape of said concave portion.

2. A method of producing a planar lens array, comprising the steps of:

sticking a glass substrate to a flat member having a plurality of predetermined spherical or aspherical concave portions formed therein; and irradiating a converged laser beam onto a surface of said glass substrate just under said plurality of concave portions while making said converged laser beam penetrate through said flat member to thereby form spherical or aspherical convex portions in the inside of said plurality of concave portions respectively in accordance with a shape of each of said plurality of concave portions.

3. A method of producing a planar lens array according to claim 1, wherein a linear expansion coefficient of said glass substrate in a region of temperature higher than a glass transition temperature of said glass substrate is not smaller than 1.1 times as large as that in a region of temperature lower than the glass transition temperature.

4. A method of producing a planar lens array according to claim 1, wherein an absorption factor of said glass substrate with respect to a wavelength of said laser beam used is from 30% to 95%, both inclusively.

5. A method of producing a planar lens array according to claim 2, wherein transmittance of said flat member with respect to a wavelength of said laser beam used is not lower than 70%.

6. The method of claim 2, wherein the glass substrate is formed of $Na_2O$, $MgO$, $Al_2O_3$, $SiO_2$, $K_2O$ and $CaO$.

* * * * *